United States Patent
Sanekata et al.

(10) Patent No.: US 11,492,983 B2
(45) Date of Patent: Nov. 8, 2022

(54) TRANSMISSION MECHANISM AND FLUID CONTROL VALVE

(71) Applicant: MIKUNI CORPORATION, Tokyo (JP)

(72) Inventors: Yuuhei Sanekata, Odawara (JP); Keigo Suzuki, Odawara (JP); Yuusaku Ide, Odawara (JP); Hiroki Ota, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 17/696,310

(22) Filed: Mar. 16, 2022

(65) Prior Publication Data

US 2022/0298978 A1  Sep. 22, 2022

(30) Foreign Application Priority Data

Mar. 17, 2021 (JP) .............................. JP2021-043661

(51) Int. Cl.
*F02D 9/10* (2006.01)
*F02B 37/12* (2006.01)
(Continued)

(52) U.S. Cl.
CPC ............ *F02D 9/1035* (2013.01); *F02B 37/12* (2013.01); *F02D 9/02* (2013.01); *F02D 9/107* (2013.01);
(Continued)

(58) Field of Classification Search
CPC . F02D 9/02; F02D 9/10; F02D 9/1035; F02D 9/1065; F02D 9/107; F02D 11/10;
(Continued)

(56) References Cited

U.S. PATENT DOCUMENTS

| 7,073,483 B1 * | 7/2006 | Kurita | F16K 31/043 123/337 |
| 2004/0094122 A1 * | 5/2004 | Kawai | F16K 31/043 123/399 |

(Continued)

FOREIGN PATENT DOCUMENTS

| JP | 2020033942 A | * | 3/2020 | |
| WO | WO-2017130599 A1 | * | 8/2017 | ............. F02D 11/10 |

*Primary Examiner* — John M Zaleskas

(57) ABSTRACT

A transmission mechanism includes: an intermediate shaft secured to a support portion provided in a valve body of an electric throttle valve and disposed in parallel to a motor shaft and a valve shaft; and an intermediate gear rotatably disposed at the intermediate shaft, in which the intermediate gear has a first intermediate gear engaged with a motor gear secured to the motor shaft and a second intermediate gear engaged with a valve gear secured to the valve shaft, the first intermediate gear and the second intermediate gear are integrally configured to be aligned in an axial direction of the intermediate shaft, a hemispherical recessed portion recessed upward around an axial center of the intermediate shaft is formed at a lower end portion of the intermediate gear, and a projecting portion projecting upward in a hemispherical shape around the axial center of the intermediate shaft and supporting the recessed portion is formed in a surface of the support portion facing the recessed portion of the intermediate gear.

7 Claims, 5 Drawing Sheets

(51) Int. Cl.
*F16K 31/04* (2006.01)
*F02D 9/02* (2006.01)

(52) U.S. Cl.
CPC .......... *F02D 9/1065* (2013.01); *F16K 31/043* (2013.01)

(58) Field of Classification Search
CPC .... F16K 1/221; F16K 27/0218; F16K 27/029; F16K 31/043; F16K 31/535
See application file for complete search history.

(56) References Cited

U.S. PATENT DOCUMENTS

| | | | | |
|---|---|---|---|---|
| 2004/0170346 A1* | 9/2004 | Komeda | ............... | F16C 33/583 384/479 |
| 2004/0231644 A1* | 11/2004 | Ikeda | ............... | F02D 9/1065 123/399 |
| 2004/0244772 A1* | 12/2004 | Ikeda | ............... | F02D 11/10 73/114.37 |
| 2005/0072403 A1* | 4/2005 | Miyazaki | ............... | F02D 11/10 123/399 |
| 2005/0155571 A1* | 7/2005 | Hanasato | ............... | F02D 9/1095 123/336 |
| 2006/0157027 A1* | 7/2006 | Ichikawa | ............... | F02D 11/10 123/399 |
| 2007/0103010 A1* | 5/2007 | Kouzu | ............... | H02K 5/24 310/51 |
| 2007/0272206 A1* | 11/2007 | Ikeda | ............... | F02D 9/105 123/339.14 |
| 2008/0000458 A1* | 1/2008 | Isogai | ............... | F02D 11/10 123/527 |
| 2008/0078357 A1* | 4/2008 | Hotta | ............... | F02D 9/109 123/399 |
| 2008/0087858 A1* | 4/2008 | Hatsuzawa | ............... | F02D 9/105 324/207.16 |
| 2010/0155637 A1* | 6/2010 | Mita | ............... | G01D 5/2073 29/592.1 |
| 2010/0319658 A1* | 12/2010 | Uchiyama | ............... | G01D 5/04 123/337 |
| 2011/0283970 A1* | 11/2011 | Shimada | ............... | F02D 11/10 123/337 |
| 2013/0068978 A1* | 3/2013 | Hiranuma | ............... | F02D 11/106 324/207.16 |
| 2013/0078852 A1* | 3/2013 | Mizunuma | ............... | G01B 7/30 439/527 |
| 2017/0022943 A1* | 1/2017 | Gerards | ............... | F16K 1/221 |
| 2017/0122181 A1* | 5/2017 | Murakami | ............... | F01P 3/18 |
| 2018/0202568 A1* | 7/2018 | Ogata | ............... | H01M 8/04 |
| 2021/0062734 A1* | 3/2021 | Fujinaka | ............... | F02D 9/107 |

\* cited by examiner

TRANSMISSION MECHANISM AND FLUID CONTROL VALVE

CROSS REFERENCE TO RELATED APPLICATIONS

This application claims the priority benefit of Japanese Patent Application No. 2021-043661 filed on Mar. 17, 2021, the contents of which are incorporated herein by reference.

BACKGROUND OF THE INVENTION

Field of the Invention

The present invention relates to structures of a transmission mechanism and a fluid control valve including the transmission mechanism.

Description of the Related Art

Electric throttle vales have frequently been employed as throttle valves controlling air intake volumes of internal combustion engines, for example, in recent years. Many electric throttle valves incorporate electric motors, deceleration mechanisms, and throttle valves in their bodies.

Japanese Patent No. 6419344 (hereinafter, referred to as Patent Document 1) discloses an example of an electric throttle valve. The electric throttle valve disclosed in Patent Document 1 is adapted such that a throttle shaft driving a valve element and a drive shaft (motor output shaft) of an electric motor are disposed in parallel to each other in a body and a deceleration mechanism is disposed between the motor output shaft and the throttle shaft. The deceleration mechanism is configured with a motor gear secured to the motor output shaft, an intermediate shaft secured to the body and disposed in parallel to the motor output shaft and the throttle shaft, an intermediate gear rotatably supported at the intermediate shaft, and a throttle gear (valve gear) secured to the valve shaft. In the intermediate gear, a first intermediate gear engaged with the motor gear and a second intermediate gear engaged with the throttle gear are formed.

In the aforementioned electric throttle valve in Patent Document 1, the first intermediate gear and the second intermediate gear are disposed with an offset at mutually different positions in an axial direction (the up-down direction of each page of FIGS. 1 and 2 in Patent Document 1) in the intermediate gear.

Therefore, during driving, the intermediate gear receives forces, namely a radial force received from the motor gear and a radial force received from the throttle gear, in mutually opposite directions at different positions in the axial direction to be inclined.

The intermediate gear inclined in this manner may causes a problem that there is a probability that an outer circumferential end portion at an end portion of the intermediate gear in the axial direction comes into contact with a facing part of the body, that is, a support portion of the intermediate shaft, friction is given to rotation of the intermediate gear, and lifetimes of the deceleration mechanism and the motor are shortened.

SUMMARY OF THE INVENTION

The present invention has been made in view of such a problem, and an object thereof is to provide a transmission mechanism and a fluid control valve including the transmission mechanism reducing friction when an intermediate gear comes into contact with a support member due to an inclination of the intermediate gear.

In order to achieve the aforementioned object, a transmission mechanism according to the present invention is a transmission mechanism transmitting a rotational drive force from an input shaft to an output shaft, which are disposed in parallel to each other in a support member, the transmission mechanism including: an intermediate shaft secured to the support member and disposed in paralleled to the input shaft and the output shaft; an input gear secured to the input shaft; an output gear secured to the output shaft; and an intermediate gear rotatably disposed at the intermediate shaft, in which the intermediate gear has a first intermediate gear engaged with the input gear and a second intermediate gear engaged with the output gear, the first intermediate gear and the second intermediate gear being located at mutually different positions in an axial direction of the intermediate shaft, and a hemispherical recessed portion around an axial center of the intermediate shaft is formed in either one of an end portion of the intermediate gear in an axial direction and a surface of the support member facing the end portion of the intermediate gear in the axial direction, and a projecting portion formed into a hemispherical shape around the axial center of the intermediate shaft and inserted into and disposed in the recessed portion is formed in the other of the end portion and the surface.

Also, a fluid control valve according to the present invention is a fluid control valve including: the transmission mechanism, in which the input shaft is a drive shaft of a motor, the output shaft is a valve shaft driving a valve element, the support member is disposed in a case supporting the motor and the valve shaft, and the transmission mechanism is a deceleration mechanism that decelerates rotation of the drive shaft of the motor, increases a drive torque, and transmits the drive torque to the valve shaft.

The deceleration mechanism and the fluid control valve according to the present invention are configured such that the intermediate gear is rotatably disposed relative to the intermediate shaft and the hemispherical projecting portion is inserted into the hemispherical recessed portion to support the intermediate gear, the projecting portion and the recessed portion thus smoothly slide even if the intermediate gear is inclined relative to the intermediate shaft when the intermediate gear rotates due to rotation of the input shaft, and it is possible to reduce friction between the recessed portion and the projecting portion. Also, it is possible to achieve a fluid control valve with excellent responsiveness and an extended lifetime by transmitting a drive force of the motor to the valve shaft via the deceleration mechanism.

DETAILED DESCRIPTION OF THE PREFERRED EMBODIMENTS

Hereinafter, an embodiment of the present invention will be described on the basis of the drawings.

Figure 1:
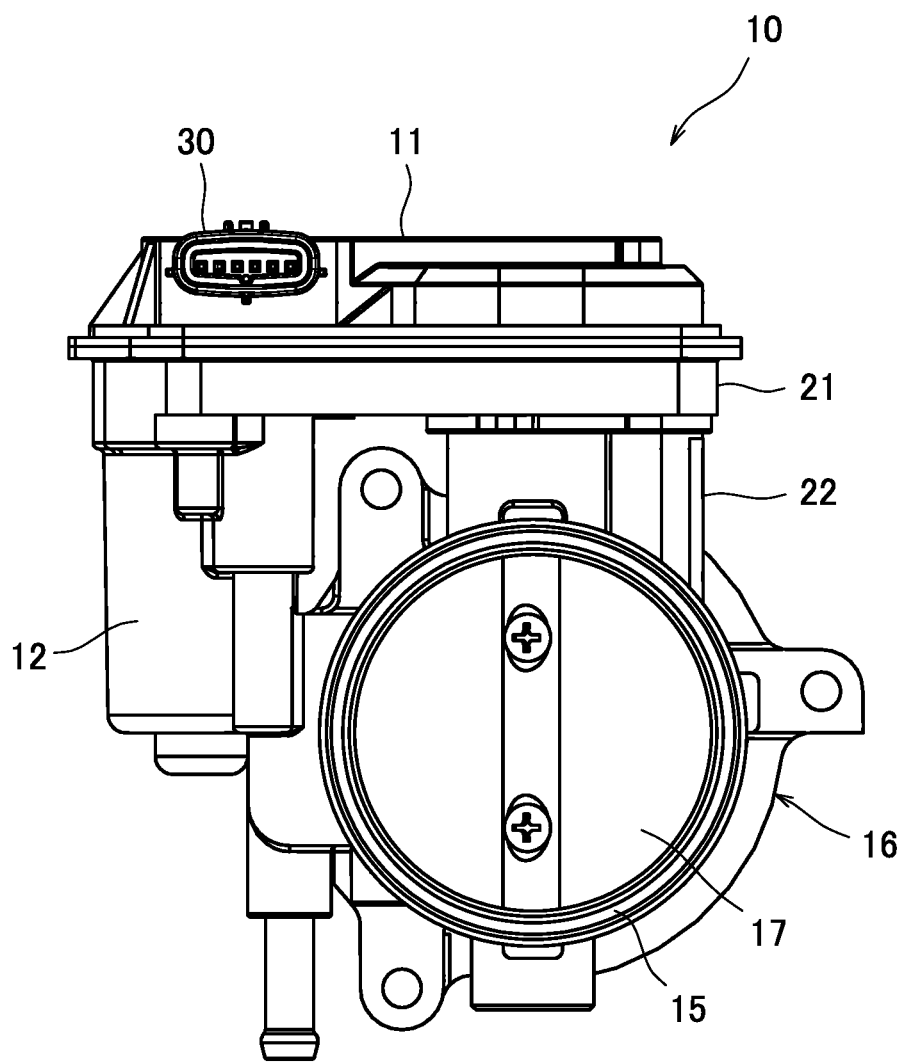
FIG. 1 is a side view of an electric throttle valve according to an embodiment of the present invention.
Figure 2:
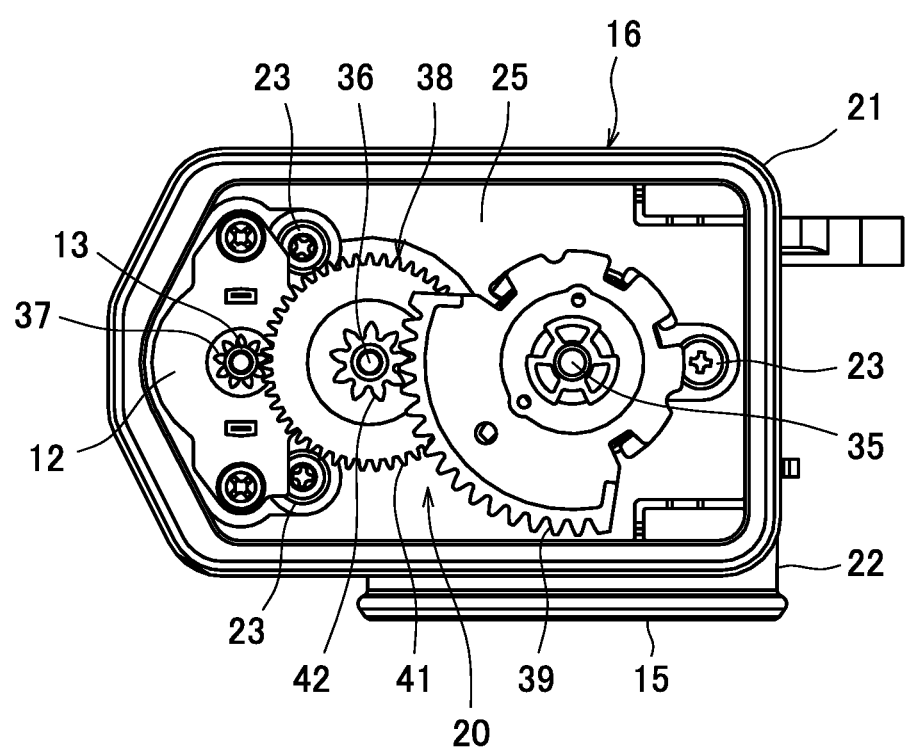
FIG. 2 is a top view of the electric throttle valve with a cover removed therefrom.
Figure 3:
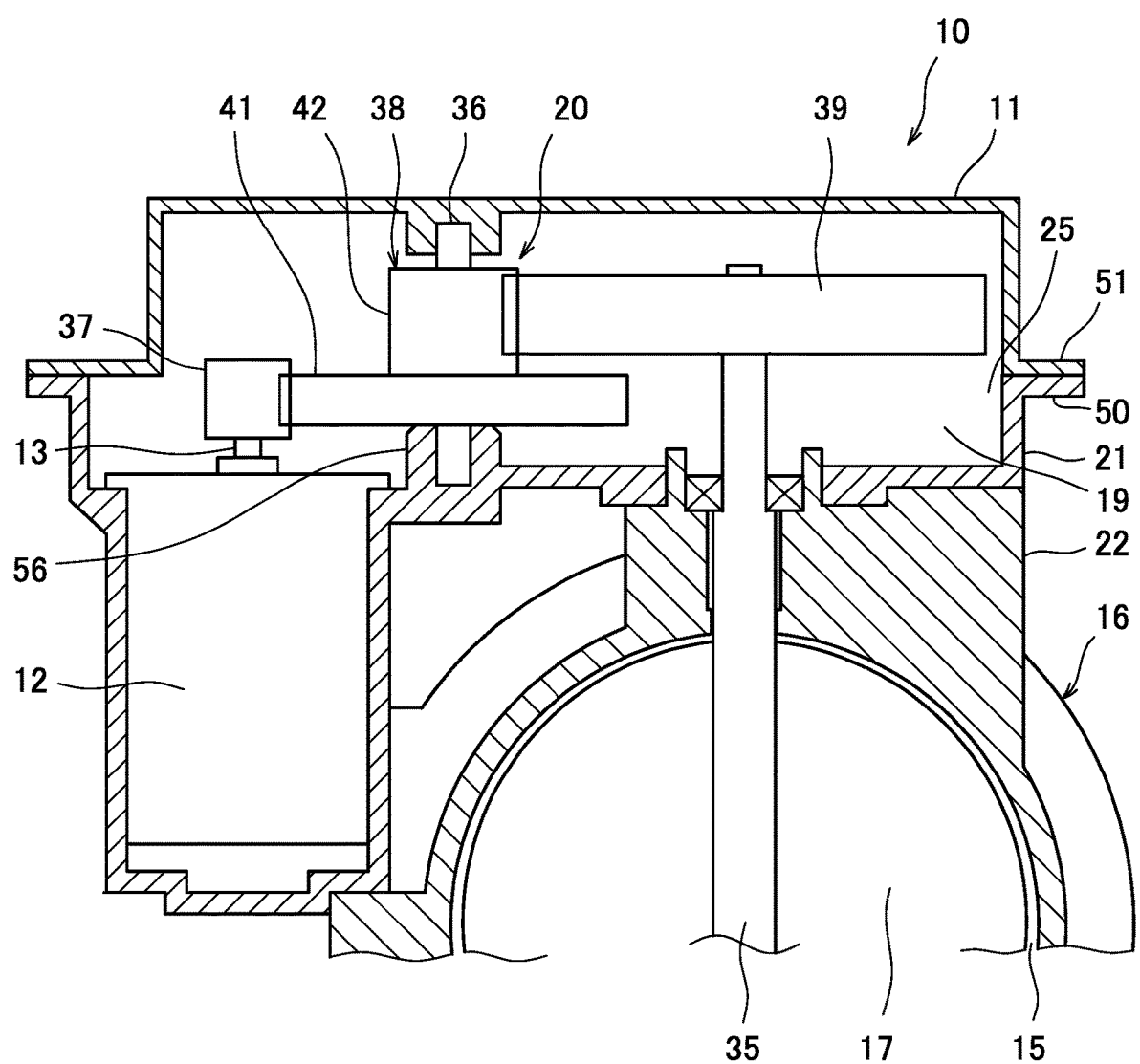
FIG. 3 is a vertical sectional view of an upper portion of the electric throttle valve.
Figure 4:
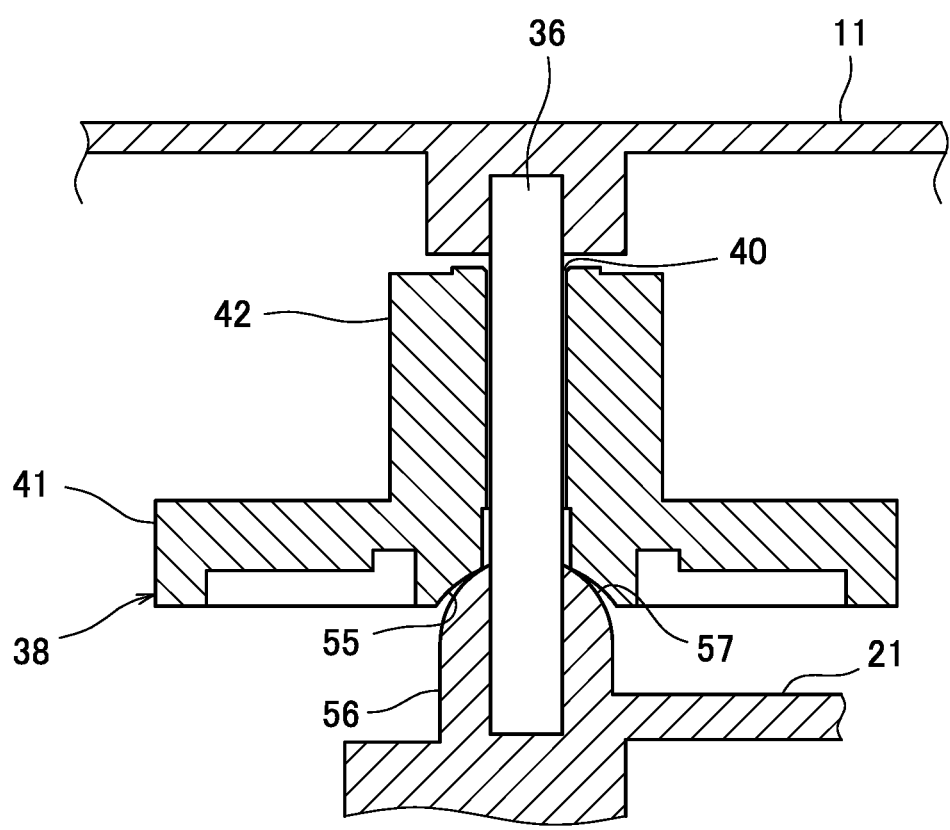
FIG. 4 is an enlarged vertical sectional view near an intermediate shaft of the electric throttle valve.

FIG. 1 is a side view of an electric throttle valve 10 (fluid control valve) according to an embodiment of the present invention. FIG. 2 is a top view of the electric throttle valve 10 with a cover 11 removed therefrom. FIG. 3 is a vertical sectional view of an upper portion of the electric throttle valve 10. FIG. 4 is an enlarged sectional view near an intermediate shaft 36 of the electric throttle valve 10.

Note that FIG. 3 is a sectional view of the upper portion of the electric throttle valve 10 cut in a vertical direction along a plane including an each axis of a motor shaft 13 (input shaft), a valve shaft 35 (output shaft), and the intermediate shaft 36 (intermediate shaft), which will be described later in detail. Also, in the electric throttle valve 10 according to the present embodiment, which will be described below, the motor shaft 13 extends in the up-down direction and a deceleration mechanism 20, which will be described later, is disposed to be located on an upper part.

The electric throttle valve 10 that is an embodiment of the present invention is a fluid control valve controlling an intake flow amount of an internal combustion engine mounted in a vehicle, for example.

As illustrated in FIGS. 1 to 3, the electric throttle valve 10 includes a valve body 16 (case) with an intake passage 15 (fluid passage) formed therein, a valve (valve element) opening and closing the intake passage 15 to adjust a flow path sectional area, and an electric motor 12 driving the valve 17.

The valve body 16 has an upper body 21 in which a housing space 19 incorporating the electric motor 12 is formed and a lower body 22 in which the intake passage 15 is formed and the valve 17 is formed, and is configured with the upper body 21 and the lower body 22 secured to each other with a bolt 23.

An opening portion 25 is provided at an upper portion of the upper body 21 to face the housing space 19, and the opening portion 25 is covered with a cover 11.

Also, the cover 11 includes a connector 30 for connecting a wiring for supplying power to the electric motor 12 and a wiring for connection to a rotation angle sensor or the like, which is not illustrated, to the outside. The connector 30 is disposed above the electric motor 12.

As illustrated in FIG. 3, the deceleration mechanism 20 (deceleration mechanism) and the electric motor 12 are accommodated in the housing space 19 between the upper body 21 and the cover 11.

The motor shaft 13 that is a drive shaft of the electric motor 12 and the valve shaft 35 driving the valve 17 extend in the up-down direction and are disposed in parallel to each other. Upper end portions of the motor shaft 13 and the valve shaft 35 are disposed in exposed from the opening portion 25 of the upper body 21. In other words, the opening portion 25 of the upper body 21 is opened in an extending direction of the upper end portion of the motor shaft 13.

The intermediate shaft 36 secured to the upper body 21 and the cover 11 and extending in the up-down direction to be parallel to the motor shaft 13 and the valve shaft 35 is formed between the motor shaft 13 and the valve shaft 35.

The deceleration mechanism 20 is configured with a motor gear 37 (input gear) secured to the upper end portion of the motor shaft 13, the intermediate shaft 36, an intermediate gear 38 rotatably supported at the intermediate shaft 36, and a valve gear 39 (output gear) secured to an upper end portion of the valve shaft 35.

The intermediate gear 38 has a first intermediate gear 41 engaged with the motor gear 37 and a second intermediate gear 42 engaged with the valve gear 39, and the first intermediate gear 41 and the second intermediate gear 42 are integrally configured to be aligned in the up-down direction, that is, to be continuous in the axial direction of the intermediate shaft 36.

The deceleration mechanism 20 performs rotation drive by transmitting a rotational drive force of the electric motor 12 from the motor shaft 13 to the valve shaft 35 via the motor gear 37, the first intermediate gear 41, the second intermediate gear 42, and the valve gear 39 while decelerating the rotational drive force and causes the valve 17 to perform opening and closing operations.

Note that a return spring, which is not illustrated, is disposed inside the upper body 21. The return spring causes the valve shaft 35 to rotate relative to the upper body 21 and biases the valve 17 to bring the valve 17 into a predetermined intermediate opening degree state, for example. Therefore, the electric throttle valve 10 is adapted such that the valve 17 is brought into the predetermined intermediate opening degree state when the electric motor 12 stops operating and the valve 17 is caused to perform opening and closing operations from the predetermined intermediate opening degree by causing the electric motor 12 to operate.

The first intermediate gear 41 is disposed to be close to the electric motor 12 side, and the second intermediate gear 42 is disposed on the cover 11 side, in the intermediate gear 38. Therefore, the motor gear 37 is disposed at a position that is close to the electric motor 12 with the up-down position thereof in the axial direction adjusted in accordance with the first intermediate gear 41, and the valve gear 39 is disposed at a position that is far from the valve 17 with the up-down position thereof in the axial direction adjusted in accordance with the second intermediate gear 42.

As illustrated in FIG. 4, a hole portion 40 into which the intermediate shaft 36 is inserted is formed at an axial center of the intermediate gear 38. Moreover, a recessed portion 55 recessed upward into a substantially hemispherical shape around an axial center of the intermediate shaft 36 is formed at an end portion of the intermediate gear 38 on the lower side in the axial direction. The recessed portion 55 is formed such that a lower end portion of the hole portion 40 spreads outward in the radial direction toward the lower side.

On the other hand, the upper body 21 is provided with a columnar support portion 56 (support member) projecting upward. A lower end portion of the intermediate shaft 36 is inserted into and secured to an upper end portion of the support portion 56. Also, the upper end portion of the support portion 56 is provided with a projecting portion 57 projecting upward into a substantially hemispherical shape around the axial center of the intermediate shaft 36. The projecting portion 57 is smoothly inclined downward from an outer peripheral position of the intermediate shaft 36 to the outer side in the radial direction. In addition, the intermediate gear 38 is disposed in a state in which the recessed portion 55 is placed on the upper side of the projecting portion 57 of the support portion 56.

Also, the curvature of the recessed portion 55 is slightly smaller than the curvature of the facing projecting portion 57, that is, the recessed portion 55 has a gentler curve than that of the projecting portion 57. Therefore, the intermediate gear 38 is supported such that the recessed portion 55 and the projecting portion 57 are brought into a surface contact in a substantially circular strip shape, at least into a liner contact in a circular shape.

Figure 5:
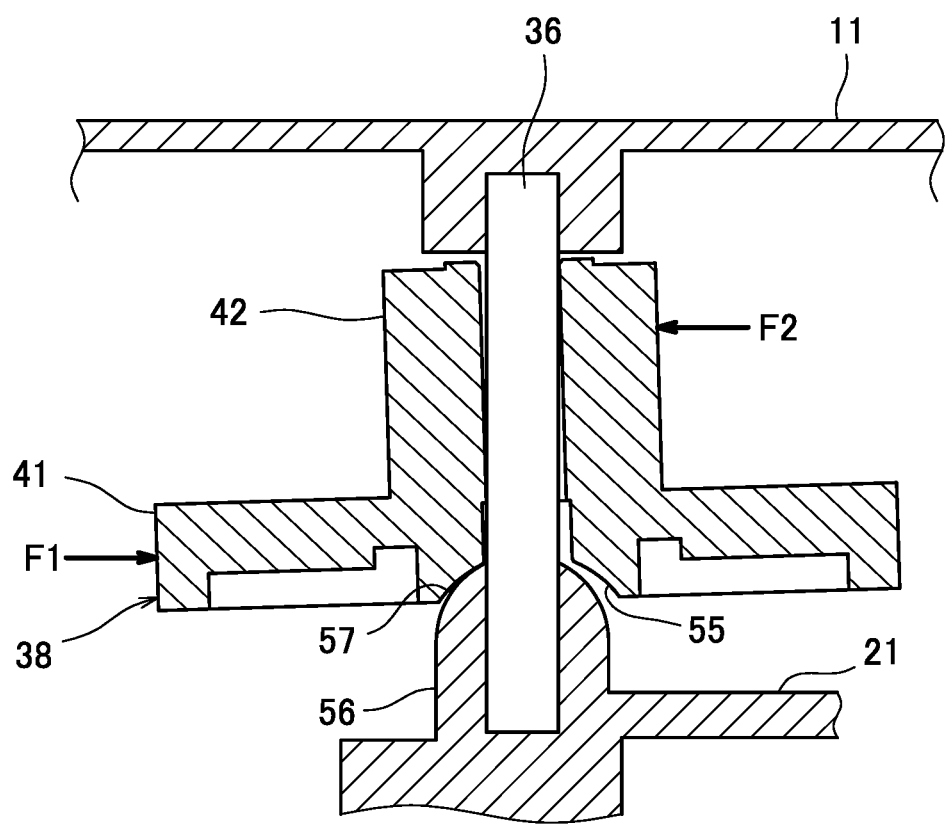
FIG. 5 is an explanatory diagram of directions of forces that an intermediate gear receives during driving of a motor.

FIG. 5 is an explanatory diagram of directions of forces that the intermediate gear 38 receives during driving of the motor.

With the aforementioned configuration, the intermediate gear 38 receives a rotational force from the motor gear 37 and receives a reaction force of the rotational force from the valve gear 39 by driving the electric motor 12 and causing the motor shaft 13 to rotate, in the deceleration mechanism 20 in the electric throttle valve 10 according to the present embodiment. At this time, as shown in FIG. 5, radial forces (forces in the radial direction) F1 and F2 that the intermediate gear 38 receives act in mutually opposite directions toward the axial center at mutually different positions in the axial direction of the intermediate shaft 36. Specifically, the engagement position between the motor gear and the intermediate gear 38 and the engagement position between the valve gear 39 and the intermediate gear 38 have different distances in the axial direction (the up-down heights on the page of FIG. 5) of the intermediate shaft 36 from a contact surface, as a basis, between the recessed portion 55 of the intermediate gear 38 and the projecting portion 57 of the support portion 56, and the radial forces F1 and F2 act on the intermediate gear 38 in mutually opposite directions, the intermediate gear 38 is thus slightly inclined on a plane passing through the axis of the intermediate shaft 36, at the time of rotation of the intermediate gear 38 due to these radial forces F1 and F2.

In the present embodiment, since a lower surface of the intermediate gear 38 and the upper surface of the support portion 56 of the upper body 21, which face each other, are in a surface contact in a circular strip shape by the recessed portion 55 and the projecting portion 57 formed into hemispherical shapes, the recessed portion 55 and the projecting portion 57 smoothly slide even if the intermediate gear 38 is inclined, and a friction (frictional force) between the recessed portion 55 and the projecting portion 57 during rotation of the intermediate gear 38 is reduced. Therefore, the friction at the deceleration mechanism 20 is reduced during the rotation driving of the electric motor 12, and it is thus possible to improve responsiveness of opening and closing drive of the valve 17 in the electric throttle valve 10 and to extend lifetimes of the electric motor 12 and the deceleration mechanism 20.

Also, the lower surface of the intermediate gear 38 is the recessed portion 55 recessed upward, the support portion 56 is the projecting portion 57 projecting upward, and the upper surface of the projecting portion 57 is inclined downward toward the outer side in the radial direction. Therefore, even if foreign matters or the like enter a part between the recessed portion 55 and the projecting portion 57, the foreign matters or the like slides down from the upper surface of the projecting portion 57 to the outer side in the radial direction and are then easily discharged from the part between the recessed portion 55 and the projecting portion 57. It is thus possible to curb accumulation of the foreign matters or the like between the recessed portion 55 and the projecting portion 57 and to maintain sliding performance at the recessed portion 55 and the projecting portion 57.

Moreover, since the recessed portion 55 is formed to have a smaller curvature than the curvature of the projecting portion 57, the dimension of the clearance between the recessed portion 55 and the projecting portion 57 increases toward the outer side in the radial direction. In this manner, it is possible to further easily discharge the foreign matters or the like that have entered the part between the recessed portion 55 and the projecting portion 57 to the outer side in the radial direction.

Although the description of the embodiment ends now, aspects of the present invention are not limited to the aforementioned embodiment.

For example, although the intermediate gear 38 is provided with the recessed portion 55 and the support portion 56 is provided with the projecting portion 57 in the aforementioned embodiment, the lower surface of the intermediate gear 38 may be provided with the projecting portion 57 projecting downward, and the support portion 56 may be provided with the recessed portion 55 recessed downward.

Also, although the second intermediate gear 42 is disposed above the first intermediate gear 41 in the intermediate gear 38 in the aforementioned embodiment, the present invention may be applied to a deceleration mechanism in which the first intermediate gear 41 is disposed above the second intermediate gear 42.

Also, the present invention may be applied not only to the transmission mechanism in which the intermediate shaft 36 is disposed to extend in the up-down direction as in the aforementioned embodiment but also to a transmission mechanism in which the intermediate shaft 36 is disposed to extend in a lateral direction, for example.

Also, although the electric throttle valve 10 in the aforementioned embodiment is an electric throttle valve controlling an air intake volume of an internal combustion engine, the electric throttle valve 10 may be another fluid control valve, and the present invention may be applied to a deceleration mechanism used for applications other than the fluid control valve.

REFERENCE SIGNS LIST

10 Electric throttle valve (fluid control valve)
12 Electric motor
13 Motor shaft (input shaft)
16 Valve body
17 Valve (valve element)
20 Deceleration mechanism (speed changer)
21 Upper body
35 Valve shaft (output shaft)
36 Intermediate shaft
37 Motor gear (input gear)
38 Intermediate gear
39 Valve gear (output gear)
41 First intermediate gear
42 Second intermediate gear
55 Recessed portion
56 Support portion
57 Projecting portion

What is claimed is:

1. A transmission mechanism transmitting a rotational drive force from an input shaft to an output shaft, which are disposed in parallel to each other in a support member, the transmission mechanism comprising:
   an intermediate shaft secured to the support member and disposed in parallel to the input shaft and the output shaft;
   an input gear secured to the input shaft;
   an output gear secured to the output shaft; and
   an intermediate gear rotatably disposed at the intermediate shaft,
   wherein the intermediate gear has a first intermediate gear engaged with the input gear and a second intermediate gear engaged with the output gear, the first intermediate gear and the second intermediate gear being located at mutually different positions in an axial direction of the intermediate shaft, and
   a hemispherical recessed portion around an axial center of the intermediate shaft is formed in either one of an end portion of the intermediate gear in an axial direction and a surface of the support member facing the end portion of the intermediate gear in the axial direction, and a projecting portion formed into a hemispherical shape around the axial center of the intermediate shaft and inserted into and disposed in the recessed portion is formed in the other of the end portion and the surface.

2. The transmission mechanism according to claim 1, wherein the recessed portion is formed at an end portion of the intermediate gear on a lower side in the axial direction and is formed to be recessed upward, and the recessed portion is placed on the projecting portion, and the intermediate shaft is supported by the support member.

3. The transmission mechanism according to claim 2, wherein a curvature of the recessed portion is smaller than a curvature of the projecting portion.

4. A fluid control valve comprising:

the transmission mechanism according to claim 1, wherein the input shaft is a drive shaft of a motor, the output shaft is a valve shaft driving a valve element, the support member is disposed in a case supporting the motor and the valve shaft, and the transmission mechanism is a deceleration mechanism that decelerates rotation of the drive shaft of the motor, increases a drive torque, and transmits the drive torque to the valve shaft.

5. The fluid control valve according to claim 4, wherein the fluid control valve is a throttle valve controlling an intake flow amount of an internal combustion engine.

6. A fluid control valve comprising:

the transmission mechanism according to claim 2, wherein the input shaft is a drive shaft of a motor, the output shaft is a valve shaft driving a valve element, the support member is disposed in a case supporting the motor and the valve shaft, and the transmission mechanism is a deceleration mechanism that decelerates rotation of the drive shaft of the motor, increases a drive torque, and transmits the drive torque to the valve shaft.

7. A fluid control valve comprising:

the transmission mechanism according to claim 3, wherein the input shaft is a drive shaft of a motor, the output shaft is a valve shaft driving a valve element, the support member is disposed in a case supporting the motor and the valve shaft, and the transmission mechanism is a deceleration mechanism that decelerates rotation of the drive shaft of the motor, increases a drive torque, and transmits the drive torque to the valve shaft.

\* \* \* \* \*